United States Patent [19]
Luo et al.

[11] Patent Number: 5,919,875
[45] Date of Patent: Jul. 6, 1999

[54] METHOD OF PREPARING SYNDIOTACTIC 1,2-POLYBUTADIENE WITH A CHROMIUM-BASED CATALYST SYSTEM

[75] Inventors: Steven Luo, Akron; Michael W. Hayes, Canton; Dennis R. Brumbaugh, North Canton, all of Ohio

[73] Assignee: Bridgestone Corporation, Tokyo, Japan

[21] Appl. No.: 09/173,254

[22] Filed: Oct. 14, 1998

[51] Int. Cl.$^6$ .............................. C08F 4/69; C08F 136/06
[52] U.S. Cl. ......................... 526/139; 526/136; 526/335
[58] Field of Search ................................... 526/139, 335, 526/100, 138, 136

[56] References Cited

U.S. PATENT DOCUMENTS

| | | |
|---|---|---|
| 3,498,963 | 3/1970 | Ichikawa et al. . |
| 3,778,424 | 12/1973 | Mugiura et al. . |
| 4,168,357 | 9/1979 | Throckmorton et al. . |
| 4,168,374 | 9/1979 | Throckmorton et al. . |
| 4,182,813 | 1/1980 | Makino et al. . |
| 4,751,275 | 6/1988 | Witte et al. . |

FOREIGN PATENT DOCUMENTS

| | | |
|---|---|---|
| 48-6939 | 3/1973 | Japan . |
| 48-64178 | 9/1973 | Japan . |

OTHER PUBLICATIONS

An article by L. Porri and A. Giarrusso in *Comprehensive Polymer Science*, vol. 4, pp. 53–107, entitled "Conjugated Diene Polymerization" published in 1989 by Pergamon Press, Oxford.

An article by H. Ashitaka et al. in *Journal of Polymer Science Polymer Chemistry Edition*, vol. 21, pp. 1853–1860 and 1951–1995 entitled Syndiotactic 1,2–Polybutadiene with Co–CS$_2$ Catalyst System. I. Preparation, Properties, and Application of Highly Crystalline Syndiotactic 1,2–Polybutadiene, II. Catalysts for Stereospecific Polymerization of Butadiene to Syndiotactic 1,2–Polybutadiene, III. $^1$–and $^{13}$C–NMR Study of Highly Syndiotactic 1,2–Polybutadiene, and IV Mechanism of Syndiotactic Polymerization of Butadiene with Cobalt Compounds–Organoaluminum–CS$_2$ published in 1983 by John Wiley & Sons, Inc., New York.

*Primary Examiner*—Fred Teskin
*Attorney, Agent, or Firm*—Daniel N. Hall

[57] ABSTRACT

A process for polymerizing 1,3-butadiene into syndiotactic 1,2-polybutadiene is described using a catalyst system comprising (a) a chromium-containing compound, (b) an organoaluminum hydride, and (c) a hydrogen phosphite. The use of the catalyst system avoids the use of environmentally detrimental components such as carbon disulfide and halogenated solvents. The syndiotactic 1,2-polybutadiene can be used as a plastic or as an additive for rubber compositions wherein it can crosslink with conventional rubbers using conventional crosslinking agents.

19 Claims, No Drawings

METHOD OF PREPARING SYNDIOTACTIC 1,2-POLYBUTADIENE WITH A CHROMIUM-BASED CATALYST SYSTEM

FIELD OF INVENTION

The present invention relates to a process for producing syndiotactic 1,2-polybutadiene with a catalyst system which comprises a chromium-containing compound, an organoaluminum hydride, and a hydrogen phosphite. Syndiotactic 1,2-polybutadiene exhibits properties of both plastics and rubber. It can be blended into rubbers and due to its residual carbon-carbon unsaturation it can be cocured with unsaturated rubbers.

BACKGROUND OF THE INVENTION

Syndiotactic 1,2-polybutadiene can be made by solution, emulsion or suspension polymerization. The syndiotactic 1,2-polybutadiene from solution, emulsion, or suspension polymerization typically has a melting temperature which is within the range of about 195° C. to 215° C.

Various transition metal catalyst systems based on cobalt, titanium, vanadium, chromium, and molybdenum have been reported in the prior art for the preparation of syndiotactic 1,2-polybutadiene (see, e.g., L. Porri and A. Giarrusso, in *Comprehensive Polymer Science,* edited by G. C. Eastmond, A. Ledwith, S. Russo and P. Sigwalt, Pergamon Press: Oxford, 1989, Volume 4, Page 53). However, the majority of these catalyst systems have no practical utility because they have low catalytic activity or poor stereoselectivity and in some cases produce low molecular weight polymers or crosslinked polymers unsuitable for commercial use.

The following cobalt-based catalyst systems are well known for the preparation of syndiotactic 1,2-polybutadiene: (1) cobalt bis(acetylacetonate)/triethyl aluminum/water/triphenyl phosphine (U.S. Pat. Nos. 3,498,963 and 4,182,813; Jap. Kokoku 44-32426, assigned to Japan Synthetic Rubber Co. Ltd.), and (2) cobalt tris(acetylacetonate)/triethyl aluminum/carbon disulfide (U.S. Pat. No. 3,778,424; Jap. Kokoku 72-19,892, 81-18,127, 74-17,666, and 74-17,667; Jap. Kokai 81-88,408, 81-88,409, 81-88,410, 75-59,480, 75-121,380, and 75-121,379, assigned to Ube Industries Ltd.). These two catalyst systems also have serious disadvantages.

The cobalt bis(acetylacetonate)/triethyl aluminum/water/triphenyl phosphine system yields syndiotactic 1,2-polybutadiene having very low crystallinity. In addition, this catalyst system develops sufficient catalytic activity only in halogenated hydrocarbon solvents as the polymerization medium, and halogenated solvents present the problems of toxicity.

The cobalt tris(acetylacetonate)/triethyl aluminum/carbon disulfide system uses carbon disulfide as one of the catalyst components. Because of its high volatility, obnoxious smell, low flash point as well as toxicity, carbon disulfide is difficult and dangerous to use and requires expensive safety measures to prevent even minimal amounts escaping into the atmosphere. Furthermore, the syndiotactic 1,2-polybutadiene produced with this catalyst system has a very high melting temperature within the range of 200–210° C., which makes it difficult to process the polymer. Although the melting temperature of the syndiotactic 1,2-polybutadiene can be reduced by the use of a catalyst modifier as a fourth catalyst component, the presence of such a catalyst modifier also has an adverse effect on the catalyst activity and polymer yields. Accordingly, many restrictions are required for the industrial utilization of the two aforesaid cobalt-based catalyst systems of the prior art.

Coordination catalyst systems based on chromium-containing compounds such as chromium(III) acetylacetonate/triethylaluminum have been known for a long time, but they have low catalytic activity and poor stereoselectivity for the polymerization of 1,3-butadiene and give rise to oligomers, low molecular weight liquid polymers or crosslinked polymers. Therefore, these chromium-based catalyst systems of the prior art have no industrial utility.

Japanese patents JP-A-7306939 and JP-A-7364178, both assigned to Mitsubishi, disclose a process for polymerization of 1,3-butadiene to amorphous 1,2-polybutadiene by using a ternary catalyst system comprising: (a) a soluble chromium(III) compound, (b) a trialkyl aluminum compound, and (c) a dialkyl hydrogen phosphite. The product was reported to be a white rubbery polymer which contained a portion of gel and displayed no obvious melting point.

U.S. Pat. No. 4,751,275, assigned to Bayer, discloses a process for the preparation of syndiotactic 1,2-polybutadiene by solution polymerization of 1,3-butadiene in a hydrocarbon polymerization medium. The catalyst system used in this solution polymerization contains a hydrocarbon-soluble chromium(III) compound, a trialkylaluminum compound, and dineopentyl hydrogen phosphite or methyl neopentyl hydrogen phosphite. However, the polymerization product was not well characterized as neither the melting temperature nor the degree of syndiotacticity of the product is reported.

U.S. Pat. No. 4,168,357 and U.S. Pat. No. 4,168,374, both assigned to Goodyear, describe a similar chromium-based catalyst system for the preparation of high cis-1,4-polypentadiene. They disclose dialkylaluminum hydrides for preparing high cis-1,4-polypentadiene, e.g. in column 2, lines 44–52 of U.S. Pat. No. 4,168,357, but they do not claim dialkylaluminum hydrides as part of their catalyst system in the claims.

SUMMARY OF THE INVENTION

The present invention relates to an improved process for polymerization of 1,3-butadiene to syndiotactic 1,2-polybutadiene using a catalyst system comprising: (a) a chromium-containing compound, (b) an organoaluminum hydride compound, and (c) a hydrogen phosphite. While chromium-based catalyst systems are known, the use in combination with organoaluminum hydride and hydrogen phosphite to yield syndiotactic 1,2-polybutadiene was not known. The catalyst system of the present invention is operational under a variety of conditions (e.g. with or without solvents, over broad temperature range, and with a variety of molecular weight regulators). The use of the catalyst system avoids the use of environmentally detrimental components such as the carbon disulfide and halogenated solvents used in prior art catalysts. The use of the catalyst system of this disclosure also offers an alternative lower melting temperature syndiotactic 1,2-polybutadiene which can be mixed with rubber at lower temperatures than the 195–215° C. melting temperature typical of syndiotactic 1,2-polybutadiene made by prior art catalyst systems.

DETAILED DESCRIPTION OF THE INVENTION

This invention teaches a process for producing syndiotactic 1,2-polybutadiene by polymerizing 1,3-butadiene in the presence of a catalyst system comprising: (a) a chromium-containing compound, (b) an organoaluminum hydride compound, and (c) a hydrogen phosphite.

As the component (a) of the catalyst system of the present invention, various chromium-containing compounds can be utilized. It is generally advantageous to employ chromium-containing compounds that are soluble in a hydrocarbon solvent such as aromatic hydrocarbons, aliphatic hydrocarbons, or cycloaliphatic hydrocarbons. Nevertheless, insoluble chromium-containing compounds may merely be suspended in the polymerization medium to form the catalytically active species. Accordingly, no limitations should be placed on the chromium-containing compounds to insure solubility.

The chromium in the chromium-containing compounds employed in the catalyst system of the present invention can be in various oxidation states including, but not limited to, the 0, +2, +3, and +4 oxidation states. It is preferable to use divalent chromium compounds (also called chromous compounds), wherein the chromium is in the +2 oxidation state, and trivalent chromium compounds (also called chromic compounds), wherein the chromium is in the +3 oxidation state. Suitable types of chromium-containing compounds that can be utilized in the catalyst system of the present invention include, but are not limited to, chromium carboxylates, chromium β-diketonates, chromium alkoxides or aryloxides, chromium halides, chromium pseudo-halides, and organochromium compounds.

Some specific examples of suitable chromium carboxylates include chromium(II) formate, chromium(III) formate, chromium(II) acetate, chromium(III) acetate, chromium(II) acrylate, chromium(III) acrylate, chromium(II) methacrylate, chromium(III) methacrylate, chromium(II) valerate, chromium(III) valerate, chromium(II) gluconate, chromium(III) gluconate, chromium(II) citrate, chromium (III) citrate, chromium(II) fumarate, chromium(III) fumarate, chromium(II) lactate, chromium (III) lactate, chromium(II) maleate, chromium(III) maleate, chromium (II) oxalate, chromium(III) oxalate, chromium(II) 2-ethylhexanoate, chromium(III) 2-ethylhexanoate, chromium(II) neodecanoate, chromium(III) neodecanoate, chromium(II) naphthenate, chromium(III) naphthenate, chromium(II) stearate, chromium(III) stearate, chromium (II) oleate, chromium(III) oleate, chromium(II) benzoate, chromium(III) benzoate, chromium(II) picolinate, and chromium(III) picolinate.

Some specific examples of suitable chromium β-diketonates include chromium(II) acetylacetonate, chromium(III) acetylacetonate, chromium(II) trifluoroacetylacetonate, chromium(III) trifluoroacetylacetonate, chromium(II) hexafluoroacetylacetonate, chromium(III) hexafluoroacetylacetonate, chromium(II) benzoylacetonate, chromium(III) benzoylacetonate, chromium(II) 2,2,6,6-tetramethyl-3,5-heptanedionate, and chromium(III) 2,2,6,6-tetramethyl-3,5-heptanedionate.

Some specific examples of suitable chromium alkoxides or aryloxides include chromium(II) methoxide, chromium (III) methoxide, chromium(II) ethoxide, chromium(III) ethoxide, chromium(II) isopropoxide, chromium(III) isopropoxide, chromium(II) 2-ethylhexoxide, chromium (III) 2-ethylhexoxide, chromium(II) phenoxide, chromium (III) phenoxide, chromium(II) nonylphenoxide, chromium (III) nonylphenoxide, chromium(II) naphthoxide, and chromium(III) naphthoxide.

Some specific examples of suitable chromium halides include chromium(II) fluoride, chromium(III) fluoride, chromium(II) chloride, chromium(III) chloride, chromium (II) bromide, chromium(III) bromide, chromium(II) iodide, and chromium(III) iodide.

Some representative examples of suitable chromium pseudo-halides include chromium(II) cyanide, chromium (III) cyanide, chromium(II) cyanate, chromium(III) cyanate, chromium(II) thiocyanate, chromium(III) thiocyanate, chromium(II) azide, and chromium(III) azide.

As used herein, the term "organochromium compounds" refers to any chromium compound containing at least one covalent chromium-carbon bond. Some specific examples of suitable organochromium compounds include tris(allyl) chromium(III), tris(methallyl)chromium(III), tris(crotyl) chromium(III), bis(cyclopentadienyl)chromium(II) (also called chromocene), bis(pentamethylcyclopentadienyl) chromium(II) (also called decamethylchromocene), bis (benzene)chromium(O), bis(ethylbenzene)chromium(O), and bis(mesitylene)chromium(O).

The component (b) of the catalyst system of the present invention is an organoaluminum hydride compound. As used herein, the term "organoaluminum hydride compound" refers to any aluminum compound containing at least one covalent aluminum-carbon bond and at least one covalent aluminum-hydrogen bond. It is generally advantageous to employ organoaluminum hydride compounds that are soluble in the hydrocarbon polymerization medium. Thus suitable types of organoaluminum hydride compounds that can be utilized in the catalyst system of the present invention include, but are not limited to, dihydrocarbylaluminum hydride compounds and hydrocarbylaluminum dihydride compounds, which are represented by the formula $AlH_nR_{3-n}$ (n=1 or 2), wherein each R, which may be the same or different, is selected from the group consisting of alkyl, cycloalkyl, aryl, aralkyl, alkaryl, and allyl groups; each group preferably contains from 1, or the appropriate minimum number of carbon atoms to form such group, up to 20 carbon atoms. Dihydrocarbylaluminum hydride compounds are generally preferred.

Some specific examples of suitable organoaluminum hydride compounds that can be utilized in the catalyst system of the present invention are: diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride and other organoaluminum monohydrides. Also included are ethylaluminum dihydride, n-propylaluminum dihydride, isopropylaluminum dihydride, n-butylaluminum dihydride, isobutylaluminum dihydride, and n-octylaluminum dihydride and other organoaluminum dihydrides. Mixtures of the above organoaluminum hydride compounds may also be utilized.

The catalyst system of the present invention further comprises a hydrogen phosphite as the component (c). The hydrogen phosphite can be either an acyclic dihydrocarbyl hydrogen phosphite or a cyclic hydrocarbylene hydrogen phosphite.

The acyclic dihydrocarbyl hydrogen phosphite employed in the catalyst system of the present invention may be represented by the following keto-enol tautomeric structures:

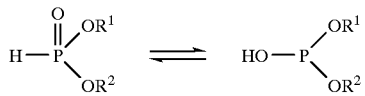

Wherein $R^1$ and $R^2$, which may be the same or different, are hydrocarbyl radicals selected from the group consisting of alkyl, cycloalkyl, aryl, aralkyl, alkaryl, and allyl groups; each group preferably containing from 1, or the appropriate minimum number of carbon atoms (e.g. 3 or 6) to form such group, up to 20 carbon atoms. The acyclic dihydrocarbyl hydrogen phosphite exists mainly as the keto tautomer (shown on the left), with the enol tautomer (shown on the right) being the minor species. Either of the two tautomers or mixtures thereof can be used as the component (c) of the catalyst system of the present invention. The equilibrium constant for the above-mentioned tautomeric equilibrium is dependent upon such factors as the temperature, the types of $R^1$ and $R^2$ groups, the type of solvent, and the like. Both tautomers may be associated in dimeric, trimeric or oligomeric forms by hydrogen bonding.

Some representative examples of suitable acyclic dihydrocarbyl hydrogen phosphites are dimethyl hydrogen phosphite, diethyl hydrogen phosphite, dibutyl hydrogen phosphite, dihexyl hydrogen phosphite, dioctyl hydrogen phosphite, didecyl hydrogen phosphite, didodecyl hydrogen phosphite, dioctadecyl hydrogen phosphite, bis(2,2,2-trifluoroethyl) hydrogen phosphite, diisopropyl hydrogen phosphite, bis(3,3-dimethyl-2-butyl) hydrogen phosphite, bis(2,4-dimethyl-3-pentyl) hydrogen phosphite, di-t-butyl hydrogen phosphite, bis(2-ethylhexyl) hydrogen phosphite, dineopentyl hydrogen phosphite, bis(cyclopropylmethyl) hydrogen phosphite, bis(cyclobutylmethyl) hydrogen phosphite, bis(cyclopentylmethyl) hydrogen phosphite, bis(cyclohexylmethyl) hydrogen phosphite, dicyclobutyl hydrogen phosphite, dicyclopentyl hydrogen phosphite, dicyclohexyl hydrogen phosphite, dimenthyl hydrogen phosphite, diphenyl hydrogen phosphite, dinaphthyl hydrogen phosphite, dibenzyl hydrogen phosphite, bis(1-naphthylmethyl) hydrogen phosphite, diallyl hydrogen phosphite, dimethallyl hydrogen phosphite, dicrotyl hydrogen phosphite, ethyl butyl hydrogen phosphite, methyl hexyl hydrogen phosphite, methyl neopentyl hydrogen phosphite, methyl phenyl hydrogen phosphite, methyl cyclohexyl hydrogen phosphite, methyl benzyl hydrogen phosphite, and the like. Mixtures of the above dihydrocarbyl hydrogen phosphites may also be utilized.

The cyclic hydrocarbylene hydrogen phosphite employed in the catalyst system of the present invention can be either a cyclic alkylene hydrogen phosphite or a cyclic arylene hydrogen phosphite and may be represented by the following keto-enol tautomeric structures:

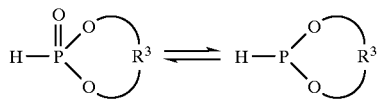

Wherein $R^3$ is a divalent alkylene or arylene group, or a divalent substituted alkylene or arylene group preferably having from 2 or 6 to about 20 carbon atoms. The cyclic hydrocarbylene hydrogen phosphites exist mainly as the keto tautomer (shown on the left), with the enol tautomer (shown on the right) being the minor species. Either of the two tautomers or mixtures thereof can be used as the component (c) of the catalyst system of the present invention. The equilibrium constant for the above-mentioned tautomeric equilibrium is dependent upon such factors as the temperature, the types of $R^3$ group, the type of solvent, and the like. Both tautomers may be associated in dimeric, trimeric or oligomeric forms by hydrogen bonding.

Some specific examples of suitable cyclic alkylene hydrogen phosphites are 2-oxo-(2H)-5-butyl-5-ethyl-1,3,2-dioxaphosphorinane, 2-oxo-(2H)-5,5-dimethyl-1,3,2-dioxaphosphorinane, 2-oxo-(2H)-1,3,2-dioxaphosphorinane, 2-oxo-(2H)-4-methyl-1,3,2-dioxaphosphorinane, 2-oxo-(2H)-5-ethyl-5-methyl-1,3,2-dioxaphosphorinane, 2-oxo-(2H)-5,5-diethyl-1,3,2-dioxaphosphorinane, 2-oxo-(2H)-5-methyl-5-propyl-1,3,2-dioxaphosphorinane, 2-oxo-(2H)-4-isopropyl-5,5-dimethyl-1,3,2-dioxaphosphorinane, 2-oxo-(2H)-4,6-dimethyl-1,3,2-dioxaphosphorinane, 2-oxo-(2H)-4-propyl-5-ethyl-1,3,2-dioxaphosphorinane, 2-oxo-(2H)-4-methyl-1,3,2-dioxaphospholane, 2-oxo-(2H)-4,5-dimethyl-1,3,2-dioxaphospholane, 2-oxo-(2H)-4,4,5,5-tetramethyl-1,3,2-dioxaphospholane and the like. Mixtures of the above cyclic alkylene hydrogen phosphites may also be utilized.

Some specific examples of suitable cyclic arylene hydrogen phosphites are 2-oxo-(2H)-4,5-benzo-1,3,2-dioxaphospholane, 2-oxo-(2H)-4,5-(3'-methylbenzo)-1,3,2-dioxaphospholane, 2-oxo-(2H)-4,5-(4'-methylbenzo)-1,3,2-dioxaphospholane, 2-oxo-(2H)-4,5-(4'-tert-butylbenzo)-1,3,2-dioxaphospholane, 2-oxo-(2H)-4,5-naphthalo-1,3,2-dioxaphospholane, and the like. Mixtures of the above cyclic arylene hydrogen phosphites may also be utilized.

The catalyst system of the present invention contains the above-described three components (a), (b), and (c) as the main components. In addition to the three catalyst components (a), (b), and (c), other catalyst components such as other organometallic compounds, which are known in the art, can also be added, if desired.

The catalyst system of the present invention has very high catalytic activity over a wide range of total catalyst concentrations and catalyst component ratios. The three catalyst components (a), (b), and (c) apparently interact to form the active catalyst species. Accordingly, the optimum concentration for any one catalyst component is dependent upon the concentrations of the other two catalyst components. While polymerization will occur over a wide range of catalyst concentrations and catalyst component ratios, the polymers having the most desirable properties are obtained within a narrower range of catalyst concentrations and catalyst component ratios.

The molar ratio of the organoaluminum hydride compound to the chromium-containing compound (Al/Cr) in the catalyst system of the present invention can be varied from about 1:1 to about 100:1. However, a more preferred range of Al/Cr molar ratio is from about 3:1 to about 50:1, and a most preferred range is from about 5:1 to about 20:1. The molar ratio of the hydrogen phosphite to the chromium-containing compound (P/Cr) can be varied from about 0.5:1 to about 50:1, with a more preferred range of P/Cr molar ratio being from about 1:1 to about 25:1 and a most preferred range being from about 2:1 to about 10:1.

The total catalyst concentration in the polymerization mass depends on such factors as the purity of the components, the polymerization rate and conversion desired, the polymerization temperature, and the like. Accordingly, specific total catalyst concentrations cannot be definitively set forth except to say that catalytically effective amounts of the respective catalyst components should be used. Generally, the amount of the chromium-containing compound used can be varied from about 0.01 to about 2 mmol per 100 g of 1,3-butadiene, with a more preferred range being from about 0.02 to about 1.0 mmol per 100 g of 1,3-butadiene and a most preferred range being from about 0.1 to about 0.5 mmol per 100 g of 1,3-butadiene. Certain specific total catalyst concentrations and catalyst component ratios that produce polymers having desired properties will be illustrated in the examples given to explain the teachings of the present invention.

The three catalyst components of this invention may be introduced into the polymerization system in several different ways. Thus, the catalyst may be formed in situ by adding the three catalyst components to the monomer/solvent mixture in either a stepwise or simultaneous manner; the sequence in which the components are added in a stepwise manner is not critical but the components are preferably added in the sequence of the organoaluminum hydride compound, the chromium-containing compound, and finally the hydrogen phosphite. Alternatively, the three catalyst components may also be premixed outside the polymerization system at an appropriate temperature (e.g., from about −20° C. to about 80° C.), and the resulting mixture then added to the polymerization system. Additionally, the catalyst may also be preformed, that is, the three catalyst components are premixed in the presence of a small amount of 1,3-butadiene monomer at an appropriate temperature (e.g., from about −20° C. to about 80° C.), prior to being charged to the main portion of the monomer/solvent mixture that is to be polymerized. The amount of 1,3-butadiene monomer which may be used during the preforming of the catalyst can range from about 1 to about 500 moles per mole of the chromium-containing compound, and preferably should be from about 4 to about 50 moles per mole of the chromium-containing compound. In addition, the three catalyst components may also be introduced to the polymerization system using a two-stage procedure. This procedure involves first reacting the chromium-containing compound with the organoaluminum hydride compound in the presence of a small amount, as specified above, of 1,3-butadiene monomer at an appropriate temperature (e.g., from about −20° C. to about 80° C.). The resultant reaction mixture and the hydrogen phosphite are then added to the main portion of the monomer/solvent mixture in either a stepwise or simultaneous manner. Further, an alternative two-stage procedure may also be employed. This involves first reacting the chromium-containing compound with the hydrogen phosphite at an appropriate temperature (e.g., from about −20° C. to about 80° C.) to form a chromium complex, followed by adding the resultant chromium complex and the organoaluminum hydride compound to the monomer/solvent mixture in either a stepwise or simultaneous manner.

When a catalyst solution is prepared outside the polymerization system, the organic solvent usable for the catalyst component solution may be selected from aromatic hydrocarbons, aliphatic hydrocarbons and cycloaliphatic hydrocarbons, and mixtures of two or more of the above-mentioned hydrocarbons. Preferably, the organic solvent consists of at least one selected from benzene, toluene, xylene, hexane, heptane and cyclohexane.

In accordance with the process of the present invention, the polymerization of 1,3-butadiene monomer in the presence of the above-described chromium-based catalyst may be carried out by means of bulk polymerization, wherein no solvents are employed. Such bulk polymerization can be conducted either in a condensed liquid phase or in a gas phase.

Alternatively and more typically, the polymerization of 1,3-butadiene according to the process of the present invention is carried out in an organic solvent as the diluent. In such cases, a solution polymerization system may be employed in which both the 1,3-butadiene monomer to be polymerized and the polymer formed are soluble in the polymerization medium. Alternatively, a suspension polymerization system may be employed by choosing a solvent in which the polymer formed is insoluble. In both cases, an amount of the organic solvent in addition to the organic solvent contained in the catalyst component solutions is usually added to the polymerization system. The additional organic solvent may be either the same as or different from the organic solvent contained in the catalyst component solutions. It is normally desirable to select an organic solvent that is inert with respect to the catalyst system employed to catalyze the polymerization reaction. Suitable types of organic solvents that can be utilized as the diluent include, but are not limited to, aliphatic, cycloaliphatic, and aromatic hydrocarbons. Some representative examples of suitable aliphatic solvents include n-pentane, n-hexane, n-heptane, n-octane, n-nonane, n-decane, isopentane, isohexanes, isoheptanes, isooctanes, 2,2-dimethylbutane, petroleum ether, kerosene, petroleum spirits, and the like. Some representative examples of suitable cycloaliphatic solvents include cyclopentane, cyclohexane, methylcyclopentane, methylcyclohexane, and the like. Some representative examples of suitable aromatic solvents include benzene, toluene, xylenes, ethylbenzene, diethylbenzene, mesitylene, and the like. Commercial mixtures of the above hydrocarbons may also be used. For environmental reasons, aliphatic and cycloaliphatic solvents are highly preferred.

The concentration of the 1,3-butadiene monomer to be polymerized is not limited to a special range. However, generally, it is preferable that the concentration of the 1,3-butadiene monomer present in the polymerization medium at the beginning of the polymerization be in a range of from about 3% to about 80% by weight, but a more preferred range is from about 5% to about 50% by weight, and the most preferred range is from about 10% to about 30% by weight.

In performing the polymerization of 1,3-butadiene according to the process of the present invention, a molecular weight regulator may be employed to control the molecular weight of the syndiotactic 1,2-polybutadiene to be produced. As a result, the scope of the polymerization system can be expanded in such a manner that it can be used for the production of syndiotactic 1,2-polybutadiene ranging from an extremely high molecular weight polymer to a low molecular weight polymer. Suitable types of molecular weight regulators that can be utilized include, but are not limited to, accumulated diolefins such as allene and 1,2-butadiene; nonconjugated diolefins such as 1,6-octadiene, 5-methyl-1,4-hexadiene, 1,5-cyclooctadiene, 3,7-dimethyl-1,6-octadiene, 1,4-cyclohexadiene, 4-vinylcyclohexene, 1,4-pentadiene, 1,4-hexadiene, 1,5-hexadiene, 1,6-heptadiene, 1,2-divinylcyclohexane, 5-ethylidene-2-norbornene, 5-methylene-2-norbornene, 5-vinyl-2-norbornene, dicyclopentadiene, and 1,2,4-trivinylcyclohexane; acetylenes such as acetylene, methylacetylene and vinylacetylene; and mixtures thereof. The amount of the molecular weight regulator used, expressed in parts per hundred parts by weight of the 1,3-butadiene monomer (phm) employed in the polymerization, is in the range of about 0.01 to about 10 phm, preferably in the range of about 0.02 to about 2 phm, and most preferably in the range of about 0.05 to about 0.5 phm. In addition, the molecular weight of the syndiotactic 1,2-polybutadiene product to be obtained can also be effectively controlled by performing the polymerization of the 1,3-butadiene monomer in the presence of hydrogen. In this case, the partial pressure of hydrogen is appropriately chosen within the range of about 0.01 to about 50 atmospheres.

In accordance with the process of the present invention, the polymerization 1,3-butadiene may be carried out as a batch process, on a semi-continuous basis, or on a continuous basis. In any case, the polymerization is conducted under anaerobic conditions using an inert protective gas such as nitrogen, argon or helium, with moderate to vigorous agitation. The polymerization temperature employed in the practice of this invention may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the 1,3-butadiene monomer or the solvent, or a combination of the two methods. Although the polymerization pressure employed in the practice of this invention also may vary widely, a preferred pressure range is from about 1 atmosphere to about 10 atmospheres.

The polymerization reaction of the present invention, on reaching a desired conversion, can be stopped by addition of a known polymerization terminator into the polymerization system to inactivate the catalyst system, followed by the conventional steps of desolventization and drying as are typically employed and are known to those skilled in the art in the production of conjugated diene polymers. Typically, the terminator employed to inactivate the catalyst system is a protic compound, which includes, but is not limited to, an alcohol, a carboxylic acid, an inorganic acid, and water or a combination thereof. An antioxidant such as 2,6-di-tert-butyl-4-methylphenol may be added along with, before or after addition of the terminator. The amount of the antioxidant employed is usually in the range of 0.2% to 1% by weight of the polymer product. When the polymerization reaction has been stopped, the syndiotactic 1,2-polybutadiene product may be isolated from the polymerization mixture by precipitation with an alcohol such as methanol, ethanol, or isopropanol or by steam distillation of the solvent and the unreacted 1,3-butadiene monomer, followed by filtration. The product is then dried under a constant vacuum at a temperature within the range of about 25° C. to about 100° C. (preferably at about 60° C.).

The syndiotactic 1,2-polybutadiene product produced by the process of the present invention has a higher melting temperature and increased syndiotacticity over some of the syndiotactic 1,2-polybutadiene products produced by the chromium-based catalysts of the prior art. Desirable melting temperature for claiming purposes is from about 100 to about 140° C. and more desirably from about 102 or 105 to about 125 or 130° C. Desirable 1,2-linkage content for claiming purposes is from about 75, 80 or 83 to about 90 or 95% of the total repeat units.

The syndiotactic 1,2-polybutadiene product produced by the process of the present invention has many uses. It can be blended with various rubbers in order to improve the properties thereof. For example, it can be incorporated into elastomers in order to improve the green strength of those elastomers, particularly in tires. The supporting carcass (reinforcing carcass) of tires is particularly prone to distortion during tire building and curing procedures. For this reason the incorporation of the syndiotactic 1,2-polybutadiene into rubber compositions, which are utilized in the supporting carcass of tires, has particular utility to prevent this distortion. In addition, the incorporation of the syndiotactic 1,2-polybutadiene into tire tread compositions can reduce the heat build-up and improve wear characteristics of tires. The syndiotactic 1,2-polybutadiene product is also useful in the manufacture of food films and in many molding applications.

The practice of the present invention is further illustrated by reference to the following examples, which however, should not be construed as limiting the scope of the invention. Parts and percentages shown in the examples are by weight unless otherwise indicated.

EXAMPLE 1

An oven-dried 1-liter glass bottle was capped with a self-sealing rubber liner and a perforated metal cap and purged with a stream of dry nitrogen. The bottle was charged with 245 g of a 1,3-butadiene/hexanes blend containing 20.4% by weight of 1,3-butadiene. The following catalyst components were added to the bottle in the following order: 0.50 mmol of diisobutylaluminum hydride, 0.050 mmol of chromium(III) 2-ethylhexanoate, and 0.20 mmol of bis(2-ethylhexyl) hydrogen phosphite. The bottle was tumbled for 4 hours in a water bath maintained at 50° C. The polymerization was terminated by addition of 10 ml of isopropanol containing 0.5 g of 2,6-di-tert-butyl-4-methylphenol. The polymerization mixture was added into 3 liters of isopropanol. The polymer was isolated by filtration and dried to a constant weight under vacuum at 60° C. The yield was 38.1 g (76%). As measured by differential scanning calorimetry (DSC), the polymer had a melting temperature of 105° C. $^1$H and $^{13}$C nuclear magnetic resonance (NMR) analysis of the polymer indicated a 1,2-linkage content of 81.1% and a syndiotacticity of 69.0%. As determined by gel permeation chromatography, the polymer has a weight average molecular weight ($M_w$) of 1,400,000, a number average molecular weight ($M_n$) of 647,000, and a polydispersity index ($M_w/M_n$) of 2.2. The monomer charge, the amounts of catalyst components and the properties of the resultant syndiotactic 1,2-polybutadiene are summarized in Table I.

TABLE I

| Example No. | 1 | 2 | 3 | 4 |
|---|---|---|---|---|
| 20.4% 1,3-Bd/hexanes (g) | 245 | 245 | 245 | 245 |
| i-Bu$_2$AlH (mmol) | 0.50 | 0.55 | 0.60 | 0.65 |
| Cr(2-EHA)$_3$ (mmol) | 0.050 | 0.050 | 0.050 | 0.050 |
| HP(O)(OCH$_2$CH(Et)(CH$_2$)$_3$CH$_3$)$_2$ (mmol) | 0.20 | 0.20 | 0.20 | 0.20 |
| Cr/Al/P molar ratio | 1:10:4 | 1:11:4 | 1:12:4 | 1:13:4 |
| Polymer yield (%) after 4 h at 50° C. | 76 | 77 | 77 | 42 |
| Melting point (° C.) | 105 | 104 | 108 | 105 |
| % 1,2-Vinyl | 81.1 | 80.6 | 80.8 | 81.0 |

TABLE I-continued

| Example No. | 1 | 2 | 3 | 4 |
|---|---|---|---|---|
| Syndiotacticity (%)* | 69.0 | 68.8 | 69.2 | 69.1 |
| $M_w$ | 1,400,000 | 1,479,000 | 1,106,000 | 734,005 |
| $M_n$ | 647,000 | 750,000 | 503,000 | 346,365 |
| $M_w/M_n$ | 2.2 | 2.0 | 2.2 | 2.1 |

*Expressed in percentage of the racemic triad of the vinyl groups, excluding the vinyl groups adjacent to a monomer unit having a 1,4-linkage.

EXAMPLES 2–4

In Examples 2–4, the procedure in Example 1 was repeated with the catalyst ratio as shown in Table I. The monomer charge, the amounts of catalyst components and the properties of the resultant syndiotactic 1,2-polybutadiene produced in each example are summarized in Table I.

EXAMPLES 5–8

In Examples 5–8, the procedure in Example 1 was repeated except that dineopentyl hydrogen phosphite was substituted for bis(2-ethylhexyl) hydrogen phosphite, having the monomer and the catalyst ratio as shown in Table II. The monomer charge, the amounts of catalyst components and the properties of the resultant syndiotactic 1,2-polybutadiene produced in each example are summarized in Table II.

TABLE II

| Example No. | 5 | 6 | 7 | 8 |
|---|---|---|---|---|
| 20.4% 1,3-Bd/hexanes (g) | 245 | 245 | 245 | 245 |
| i-$Bu_2$AlH (mmol) | 0.45 | 0.50 | 0.55 | 0.60 |
| Cr(2-EHA)$_3$ (mmol) | 0.050 | 0.050 | 0.050 | 0.050 |
| HP(O)(OCH$_2$CMe$_3$)$_2$ (mmol) | 0.20 | 0.20 | 0.20 | 0.20 |
| Cr/Al/P molar ratio | 1:9:4 | 1:10:4 | 1:11:4 | 1:12:4 |
| Polymer yield (%) after 4 h at 50° C. | 68 | 77 | 71 | 36 |
| Melting point (° C.) | 112 | 113 | 117 | 121 |
| % 1,2-Vinyl | 82.6 | 82.2 | 83.0 | 83.2 |
| Syndiotacticity (%) | 71.0 | 70.5 | 70.9 | 71.2 |
| $M_w$ | 1,268,000 | 1,159,000 | 1,258,000 | 996,000 |
| $M_n$ | 689,000 | 532,000 | 420,000 | 369,000 |
| $M_w/M_n$ | 1.8 | 2.2 | 3.0 | 2.7 |

COMPARATIVE EXAMPLES 9–10

In Comparative Examples 9 and 10, the procedure in Example 1 was repeated except that triethyl aluminum was substituted for diisobutylaluminum hydride. The monomer charge, amounts of catalysts, and the properties of the resultant syndiotactic 1,2-polybutadiene produced in each example are summarized in Table III

TABLE III

| Example No. | 9 | 10 | 11 | 12 |
|---|---|---|---|---|
| 25.0% 1,3-Bd/hexanes (g) | 200 | 200 | 200 | 201 |
| Hexanes (g) | 255 | 255 | 255 | 255 |
| AlEt$_3$ (mmol) | 0.20 | 0.30 | 0.50 | 0.75 |
| Cr(2-EHA)$_3$ (mmol) | 0.050 | 0.050 | 0.050 | 0.050 |
| HP(O)(OCH$_2$CH(Et)(CH$_2$)$_3$CH$_3$)$_2$ (mmol) | 0.20 | 0.20 | 0 | 0 |
| HP(O)(OCH$_2$CMe$_3$)$_2$ (mmol) | 0 | 0 | 0.33 | 0.33 |
| Cr/Al/P molar ratio | 1:4:4 | 1:6:4 | 1:10:6.7 | 1:15:6.7 |
| Polymer yield (%) after 4 h at 50° C. | 70 | 92 | 97 | 96 |
| Melting point (° C.) | 79 | 78 | 100 | 97 |
| % 1,2-Vinyl | 80.1 | 80.0 | 83.1 | 81.1 |
| Syndiotacticity (%) | 57.0 | 57.2 | 64.0 | 66.5 |
| $M_w$ | 1,080,000 | 867,000 | 785,000 | 947,000 |
| $M_n$ | 481.000 | 273,000 | 272,000 | 658,000 |
| $M_w/M_n$ | 2.2 | 3.1 | 2.8 | 1.4 |

COMPARATIVE EXAMPLES 11–12

In Comparative Examples 11 and 12, the procedure in Example 1 was repeated except that triethyl aluminum was substituted for diisobutylaluminum hydride, and dineopentyl hydrogen phosphite was substituted for bis(2-ethylhexyl) hydrogen phosphite. The monomer charge, amounts of catalysts, and the properties of the resultant syndiotactic 1,2-polybutadiene produced in each example are summarized in Table III Comparison of the analytical data of the syndiotactic 1,2-polybutadiene products obtained in Examples 1–8 with the analytical data of the products obtained in Examples 9–12 indicates that the catalyst system of the present invention produces syndiotactic 1,2-polybutadiene of higher quality as shown by the significantly higher melting temperature and higher syndiotacticity than are obtained with the chromium-based catalyst systems of the prior art.

EXAMPLES 13–16

In Examples 13–16, a series of polymerizations were carried out to evaluate the usefulness of 1,2-butadiene as a molecular weight regulator. The procedure is essentially identical to that described in Example 1 except that various amounts of 1,2-butadiene were added to a polymerization bottle containing the monomer solution before addition of the catalyst components. The monomer charge, the amounts of catalyst components and the properties of the resultant syndiotactic 1,2-polybutadiene produced in each example are summarized in Table IV

TABLE IV

| Example No. | 13 | 14 | 15 | 16 |
|---|---|---|---|---|
| 20.4% 1,3-Bd/hexanes (g) | 245 | 245 | 245 | 245 |
| 1,2-Bd (phm) | 0.05 | 0.10 | 0.15 | 0.20 |
| i-Bu$_2$AlH (mmol) | 0.55 | 0.55 | 0.55 | 0.55 |
| Cr(2-EHA)$_3$ (mmol) | 0.050 | 0.050 | 0.050 | 0.050 |
| HP(O)(OCH$_2$CH(Et)(CH$_2$)$_3$CH$_3$)$_2$ (mmol) | 0.20 | 0.20 | 0.20 | 0.20 |
| Cr/Al/P molar ratio | 1:11:4 | 1:11:4 | 1:11:4 | 1:11:4 |
| Polymer yield (%) after 4 h at 50° C. | 74 | 33 | 30 | 22 |
| Melting point (° C.) | 103 | 105 | 104 | 103 |
| M$_w$ | 356,000 | 239,000 | 202,000 | 160,000 |
| M$_n$ | 159,000 | 103,000 | 96,000 | 80,000 |
| M$_w$/M$_n$ | 2.2 | 2.3 | 2.1 | 2.0 |

EXAMPLES 17–20

In Examples 17–20, a series of polymerizations were carried out to evaluate the usefulness of 1,2-butadiene as a molecular weight regulator. The procedure is essentially identical to that described in Examples 13–16 except that dineopentyl hydrogen phosphite was substituted for bis(2-ethylhexyl) hydrogen phosphite. The monomer charge, the amounts of catalyst components and the properties of the resultant syndiotactic 1,2-polybutadiene produced in each example are summarized in Table V

TABLE V

| Example No. | 17 | 18 | 19 | 20 |
|---|---|---|---|---|
| 20.4% 1,3-Bd/hexanes (g) | 245 | 245 | 245 | 245 |
| 1,2-Bd (phm) | 0.05 | 0.10 | 0.15 | 0.20 |
| i-Bu$_2$AlH (mmol) | 0.50 | 0.50 | 0.50 | 0.50 |
| Cr(2-EHA)$_3$ (mmol) | 0.050 | 0.050 | 0.050 | 0.050 |
| HP(O)(OCH$_2$CMe$_3$)$_2$ (mmol) | 0.20 | 0.20 | 0.20 | 0.20 |
| Cr/Al/P molar ratio | 1:10:4 | 1:10:4 | 1:10:4 | 1:10:4 |
| Polymer yield (%) after 4 h at 50° C. | 63 | 28 | 25 | 19 |
| Melting point (° C.) | 111 | 112 | 112 | 110 |
| M$_w$ | 292,000 | 191,000 | 153,000 | 112,000 |
| M$_n$ | 147,000 | 100,000 | 76,000 | 56,000 |
| M$_w$/M$_n$ | 2.0 | 1.9 | 2.0 | 2.0 |

Although the present invention has been described in the above examples with reference to particular means, materials and embodiments, it would be obvious to persons skilled in the art that various changes and modifications may be made, which fall within the scope claimed for the invention as set out in the appended claims. The invention is therefore not limited to the particulars disclosed and extends to all equivalents within the scope of the claims.

What is claimed is:

1. A process for preparing syndiotactic 1,2-polybutadiene, comprising: polymerizing 1,3-butadiene in the presence of a catalyst system comprising catalytically effective amounts of: (a) a chromium-containing compound, (b) an organoaluminum hydride, and (c) a hydrogen phosphite.

2. A process according to claim 1, wherein said chromium-containing compound is a chromium carboxylate, chromium β-ketonate, chromium alkoxide, chromium aryloxide, chromium halide, chromium pseudo-halide, or organochromium compound or combinations thereof.

3. A process according to claim 1, wherein said hydrogen phosphite has the following keto-enol tautomeric structures:

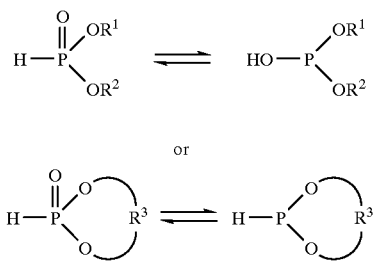

or mixtures thereof wherein $R^1$ and $R^2$ are independently an alkyl group having 1 to 20 carbon atoms, a cycloalkyl or allyl group having 3 to 20 carbon atoms, or an aryl, aralkyl, or alkaryl group having 6 to 20 carbon atoms and $R^3$ is a divalent alkylene or substituted alkylene group having 2 to 20 carbon atoms, or a divalent arylene or substituted arylene group having 6 to 20 carbon atoms.

4. A process according to claim 1, wherein said chromium-containing compound is present in the polymerization in an amount from about 0.01 to about 2 mmol per 100 g of said 1,3-butadiene.

5. A process according to claim 1, wherein said organoaluminum hydride and said chromium-containing compound are present in said catalyst system in a molar ratio (Al/Cr) from about 1:1 to 100:1.

6. A process according to claim 5, wherein said molar ratio of said organoaluminum hydride to said chromium-containing compound (Al/Cr) is from about 3:1 to 50:1.

7. A process according to claim 1, wherein said hydrogen phosphite and said chromium-containing compound are present in said catalyst system in a molar ratio (P/Cr) from about 0.5:1 to about 50:1.

8. A process according to claim 7, wherein said molar ratio of said hydrogen phosphite to said chromium-containing compound (P/Cr) is from about 1:1 to about 25:1.

9. A process according to claim 1, wherein the polymerization is conducted at a temperature from about −10° C. to about 100° C.

10. A process according to claim 1, wherein the polymerization is conducted in a hydrocarbon medium.

11. A process according to claim 10, wherein said medium comprises from about 5% to about 50% by weight of 1,3-butadiene at the beginning of said polymerization.

12. A process according to claim 1, wherein the polymerization is conducted in a hydrocarbon medium and said catalyst system is soluble in said medium.

13. A process according to claim 12, wherein said chromium-containing compound is present in the polymerization in an amount from about 0.02 to about 1 mmol per 100 g of said 1,3-butadiene.

14. A process according to claim 6, wherein said hydrogen phosphite and said chromium-containing compound are present in a molar ratio (P/Cr) from about 1:1 to about 25:1.

15. A process according to claim 14, wherein said chromium-containing compound is present in the polymerization in an amount from about 0.02 to about 1 mmol per 100 g of said 1,3-butadiene.

16. A process according to claim 1, wherein the polymerization is conducted in the presence of a molecular weight regulator.

17. A process according to claim 1, wherein said chromium-containing compound comprises a chromium carboxylate, chromium β-diketonate, or a chromium alkoxide or combinations thereof.

18. A process according to claim 1, wherein said organoaluminum hydride comprises a dialkylaluminum hydride.

19. A process according to claim 1, wherein said hydrogen phosphite comprises a dialkyl hydrogen phosphite.

* * * * *